United States Patent [19]

Wendling et al.

[11] Patent Number: 4,691,886
[45] Date of Patent: Sep. 8, 1987

[54] ADJUSTABLE DISPLAY STAND

[75] Inventors: Robert W. Wendling; John W. Kurtz; Juan M. Perez, all of Austin, Tex.

[73] Assignee: Texas Instruments Incorporated, Dallas, Tex.

[21] Appl. No.: 724,742

[22] Filed: Apr. 18, 1985

[51] Int. Cl.⁴ ........................................... F16M 11/12
[52] U.S. Cl. .................... 248/183; 248/123.1; 248/162.1; 248/178; 248/280.1
[58] Field of Search ..................... 248/183, 178, 149.1, 248/162.1, 280.1, 123.1, 371, 631, 276, 184, 585; 312/251; 180/326, 327; 267/64.11

[56] References Cited

U.S. PATENT DOCUMENTS

| | | | |
|---|---|---|---|
| 1,285,025 | 11/1918 | Burns | 248/585 X |
| 4,082,244 | 4/1978 | Groff | 248/280.1 |
| 4,166,602 | 9/1979 | Nilsen et al. | 248/280.1 |
| 4,247,067 | 1/1981 | Smith | 248/280.1 X |
| 4,318,522 | 3/1982 | Appleberry | 248/276 X |
| 4,372,515 | 2/1983 | Noonan | 248/178 |
| 4,390,314 | 6/1983 | Oberg | 180/326 X |
| 4,395,010 | 7/1983 | Helgeland et al. | 248/183 X |
| 4,438,458 | 3/1984 | Munscher | 312/251 X |
| 4,447,031 | 5/1984 | Souder et al. | 248/280.1 |
| 4,500,251 | 2/1985 | Kiryu et al. | 248/123.1 X |

FOREIGN PATENT DOCUMENTS 2754543 6/1978 Fed. Rep. of Germany ...... 180/326

Primary Examiner—Ramon O. Ramirez
Attorney, Agent, or Firm—Thomas G. Devine; James T. Comfort; Melvin Sharp

[57] ABSTRACT

A tilt and height adjustable display stand has a display mechanism connected to a base through a series of interconnecting linkage arms. A tilt gas spring and a height gas spring are interconnected within the linkage in such a manner as to offset the weight of the display mechanism when the display mechanism is tilted or moved vertically.

9 Claims, 3 Drawing Figures

ADJUSTABLE DISPLAY STAND

BACKGROUND OF THE INVENTION

This invention relates to a display stand having a mechanism for tilting the display and for vertically moving the display. More specifically, it relates to a tilt and height adjustable video display stand utilizing gas spring counterbalancing.

DESCRIPTION OF THE RELATED ART

As the use of computers is increased, there has been a greater need to display data and information on display units such as cathode ray tubes which are incorporated into video display terminals or computers, with increases in both the number of people using video display terminals and the amount of time that an individual user spends in front of the terminal. As the amount of time has increased, it has become evident that the occurrence of headaches, user fatigue, and eye, neck and back strain has increased. The ergonomics associated with the use of such terminals and computers has now become a major consideration in the design thereof.

Ideally, for a worker to be most productive, he or she should use a video display terminal which may be tilted to reduce overhead glare, and which may be raised or lowered to accommodate his or her stature. Such adjustment should be simple and positive. It should not be difficult for even the first time user to discover the means of adjustment and actually adjust accordingly.

The problem involved in the design of such a device is one of allowing a full range of reliable adjustment while keeping the means of adjustment quick, obvious and as effortless as possible. The prior art has addressed the problem as follows:

1. Screw mechanisms which are tedious to operate and require significant time.
2. Rack and pinion arrangements which must be unlocked, adjusted and relocked. Often the adjustment knobs are located in an awkward position.
3. Frictional detent devices that offer only a minimal number of adjustment positions and whose adjustment position is easily overshot.
4. Sliding friction mechanisms that are generally made up of a spring loaded metal plate that slides against another metal piece. They often do not operate smoothly and require an excessive amount of force to adjust. Further, the range of adjustment is generally not as extensive as recommended.
5. A locking "bloc-o-lift" type gas spring mechanism which requires that a button be pushed to unlock the spring. The act of pushing the button often offsets the designed function of the gas spring in the mechanism.
6. "Scissor" type stands which operate similarly to vehicle jacks. An excessive amount of force is required to operate this type of system and since a lead screw is generally employed, it takes a long time to adjust.

This invention overcomes the shortcomings of the prior art since it uses no locking mechanisms and incorporates two non-locking pressurized gas springs, in the preferred embodiment. One gas spring is used for tilt adjust and one is used for height adjust. The gas springs are used as counterbalances to offset the weight of the cathode ray tube display. The operator simply tilts the display or moves it up or down as he or she sees fit. There are no knobs or buttons and the only force which the operator must overcome is the friction which is designed into the system to make the adjustment permanent and to provide the right "feel" to the user.

BRIEF SUMMARY OF THE INVENTION

A linkage mechanism interconnects the display and the base of a video display stand. A tilt gas spring is connected to the linkage assembly in such a manner that it counterbalances the weight of the cathode ray tube display enabling a low force tiling of the display. In this preferred embodiment, there is also a height gas spring that is connected to the linkage mechanism in such a way that it counterbalances the weight of the cathode ray tube display means enabling a low force vertical adjustment of the cathode ray tube display.

The display is connected to a tilt housing which in turn is rotatably connected to a housing support. The tilt gas spring is connected between the support housing and the tilt housing in such a manner that when the tilt housing is moved (by grasping the cathode ray tube display), the gas spring is either compressed or extended, depending upon the direction of motion. The support housing is connected to the base of the display stand through a pair of support arms. A pair of stablizer arms are connected between the base and the support housing to restrict any rotation of the support housing. The height gas spring is connected between the support housing and the base in such a manner that when the support housing are moved vertically by the operator grasping the video display and moving it vertically, the height gas cylinder is either extended or compressed, depending upon the direction of motion.

Only the tilt adjusting mechanism may be employed, only the height adjusting mechanism may be employed, or, as in the preferred embodiment, a combination of both these adjustment techniques may be employed.

The principal object of this invention is to provide smooth, continuous adjustment of a video display unit without locking mechanisms or undue effort required on the part of the operator.

Another object of this invention is to provide a smooth continuous tilting adjustment of a video display unit without locking mechanism or undue effort on the part of the operator.

Still another object of this invention is to provide smooth, continuous height adjustment of a video display unit without locking mechanisms or undue effort on the part of the operator.

These and other objects will be made evident in the detailed description that follows:

DETAILED DESCRIPTION OF THE INVENTION

This invention permits easy adjustment of a display for a computer or a video display terminal, (VDT) making the use of such a device more pleasant and healthful for the human operator. That is, the display screen may be tilted and moved up and down easily and smoothly. Following is a detailed disclosure of the mechanism for accomplishing that function.

Figure 1:
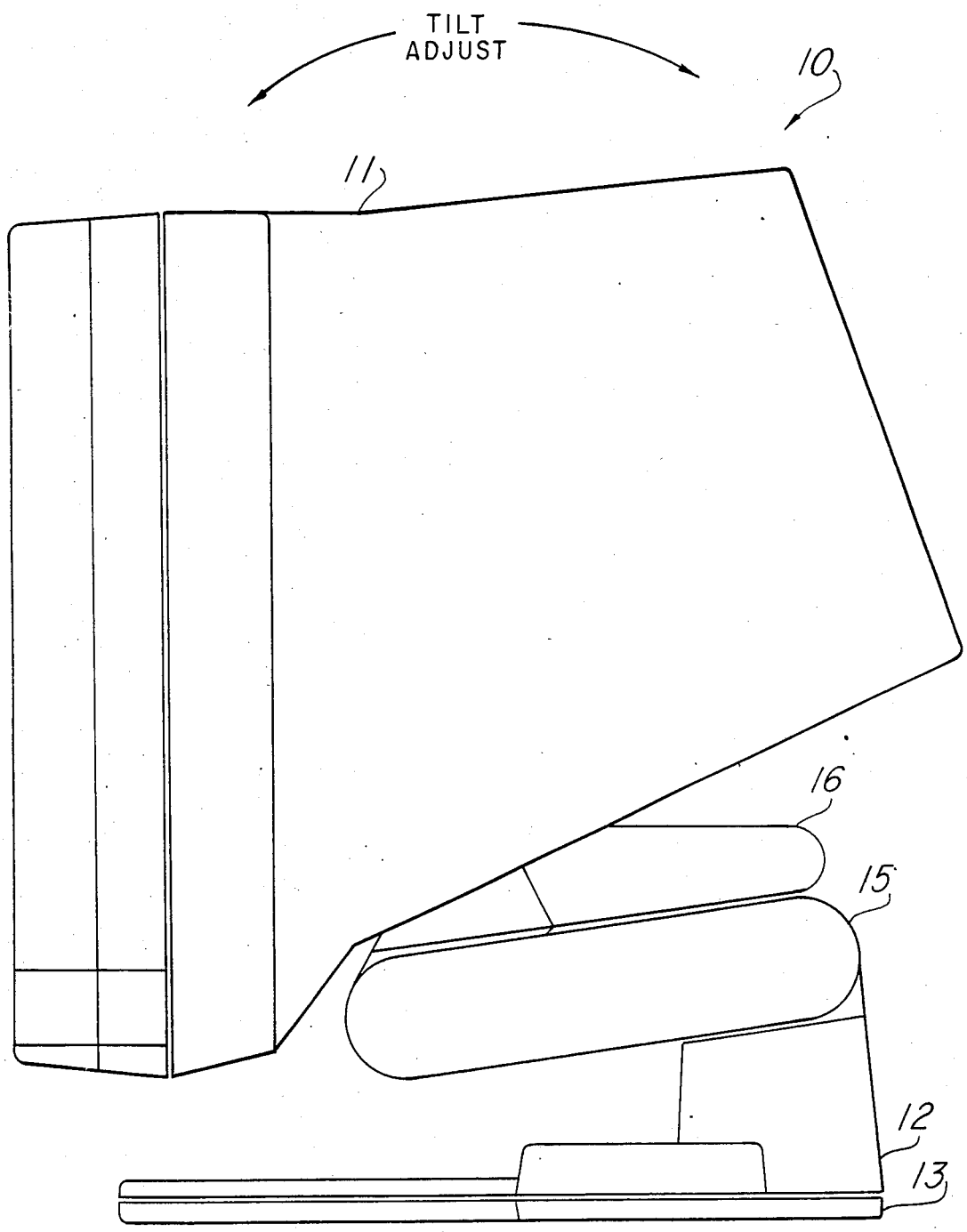
FIG. 1 is a side view of the display stand in the lowered position.

FIG. 1 shows video display stand 10 having a display device 11 mounted through elements 16 and 15 to base 12. The cathode ray tube and electronics for the cathode ray tube are not shown. FIG. 1 illustrates the stand in its lowered position and also shows the motion of tilt adjust.

Figure 2:
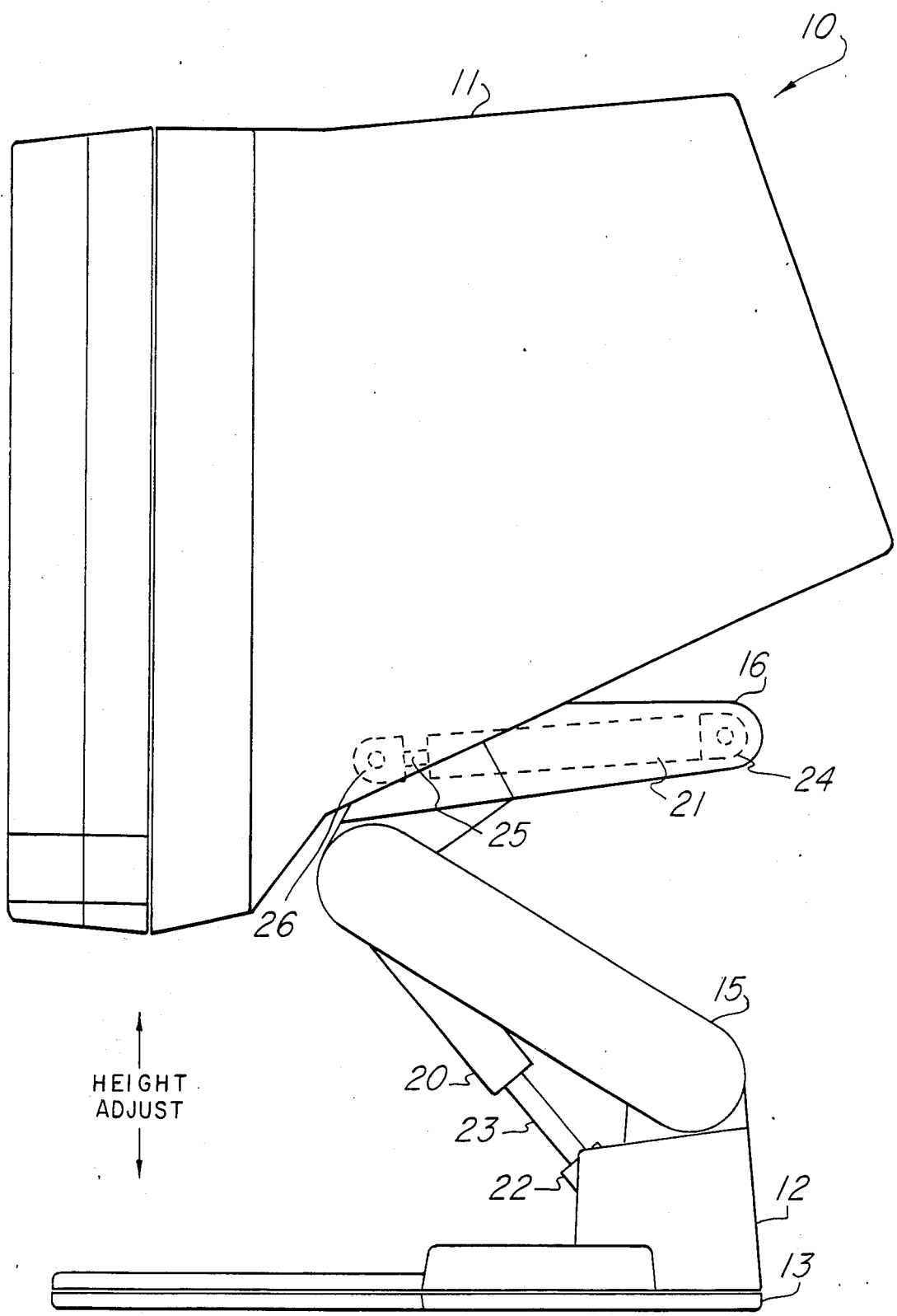
FIG. 2 is a side view of the display stand in the raised position.

FIG. 2 illustrates the VDT display terminal in the raised position. In this position, height gas spring 20 having piston 23 is partially shown. Tilt gas spring 21, having piston 25 is shown in phantom. The direction of height adjustment for the display 11 is indicated. In this preferred embodiment, both of the gas springs are manufactured by Gas Spring Company of Kolmar, Pa. The tilt gas spring is model F3556 and the height gas spring is model F3555. The selection of these two units is an engineering decision and the invention is, of course, not limited to this selection.

Figure 3:
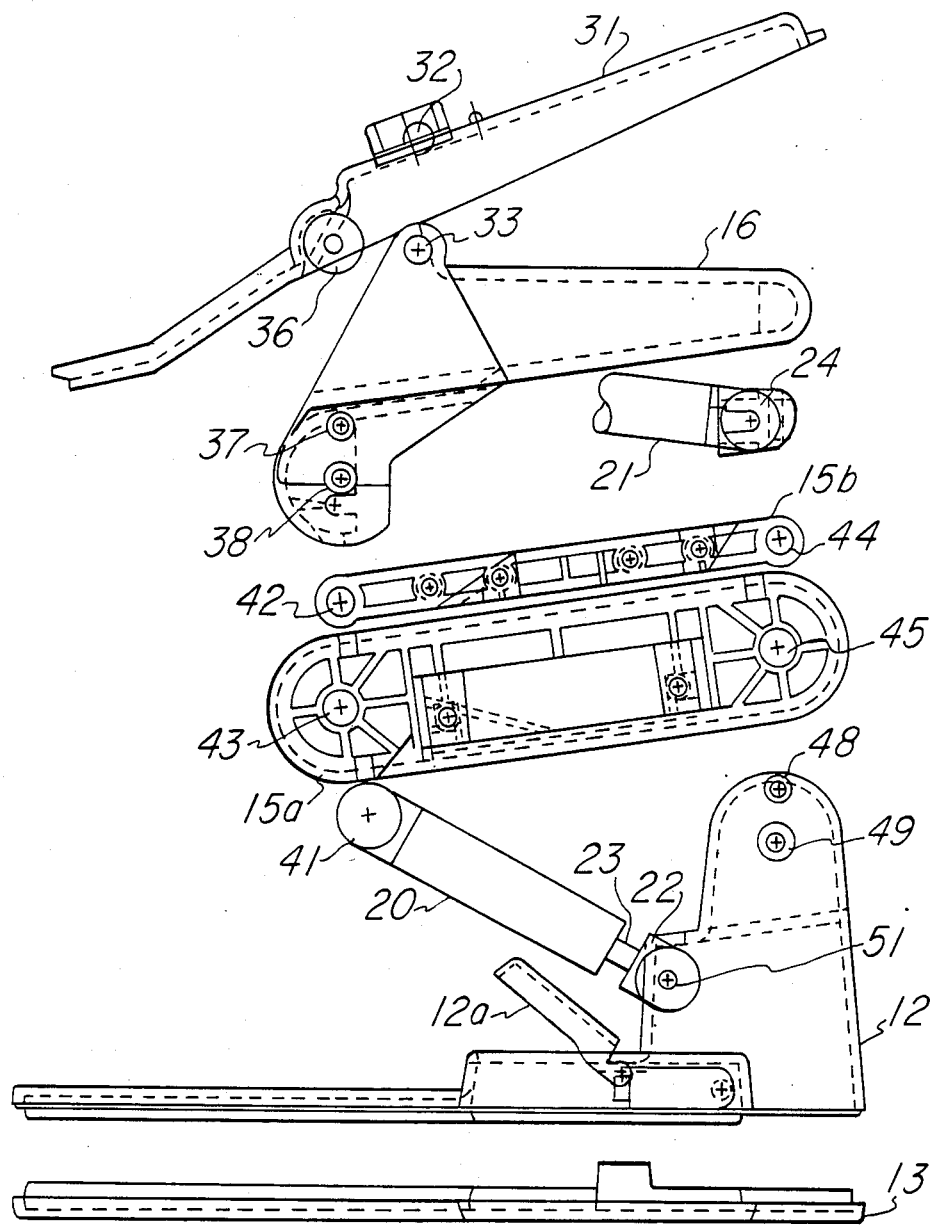
FIG. 3 is an exploded view of the linkage mechanism of this invention.

FIG. 3 illustrates tilt housing 31 having connection points 32 and 36. Display device 11 (not shown) is mounted on tilt housing 31. Support housing 16 is shown having connection point 33 which is rotatably connected to connection point 32 of tilt housing 31. A section of tilt gas spring 21 is shown terminating in connecting end 24 which is secured in support housing 16. Not shown is a connection made between the other end of tilt gas spring 21 and connection point 36. Connection points 37 and 38 of support housing 16 are also shown.

Support arm 15a is shown. In this preferred embodiment, another support arm is employed, parallel to support arm 15a. Support arms 15a are interconnected by shafts 43 and 45. Stablizer arm 15b is shown and in this preferred embodiment an identical stablizer bar is employed, positioned in parallel with stablizer bar 15b. Stablizer bars are interconnected by shafts 42 and 44. Support arms 15a and stablizer arms 15b are rotatably connected to points 38 and 37 at shafts 43 and 42, respectively.

Base 12 is shown having connection points 48 and 49 to which shaft 44 of stablizer arm 15b and shaft 45 of support arm 15a rotatably attach. Height gas spring 20 is shown rotatably connected to housing 12 at point 51 through connector 22. Height gas spring 20 also connects rotatably, through point 41 to axle 43 of support arm 15a.

MODE OF OPERATION

It can be readily seen in FIG. 3 that grasping and tilting the display 11 (not shown) causes tilt housing 31 to move in a desired direction. Tilt gas spring 21 is rotatably connected at point 36 to tilt housing 31 and therefore is compressed or extended, depending upon the direction of tilts. Tilt spring 21 is secured within support housing 16 at point 24 and has spring characteristics that are selected to counterbalance the weight of display 11 as distributed over the tilt housing 31, as well as dimensions of all of the linkages shown.

Moving display 11 vertically results in movement of support housing 16 which is turn moves stablizer arms 15b and support arms 15a. Height gas spring 20 is either extended or compressed, depending upon the direction of motion. Height gas spring 20 also has spring characteristics that are selected to counterbalance the weight of the display 11 and associated linkages.

The tensile and compressive forces encountered in the linkage was predicted to enable the proper selection of the gas springs. As indicated earlier, the selection of the gas springs is an engineering choice and the shape and lengths of the various links also may be varied by one skilled in the art, without departing from the scope of this invention which is defined by the appended claims.

We claim:

1. A tilt adjustable display stand comprising:
   (a) base means;
   (b) display means;
   (c) linkage means, connecting the base means to the display means, the linkage means including a tilt housing connected to support the display means and a support housing to which the tilt housing is pivotally attached; and
   (d) a tilt gas spring, connected to the tilt housing at one end and to the support housing at the other end, positioned to counterbalance the weight of the display means to enable low force tilting of the display means.

2. The display stand of claim 1 wherein the display means comprises a cathode ray tube.

3. A height adjustable display stand comprising:
   (a) base means;
   (b) display means;
   (c) linkage means, connecting the base means to the display means, the linkage means including a support housing attached to the display means, at least one support arm attached to the support housing at one end and to the base means at the other end, and at least one stablizer arm attached to the support housing at one end and to the base means at the other end to restrict rotation of the support housing; and
   (d) a height gas spring connected to the base means at one end and to the support housing at the other end to offset the weight of the display means when the display means is moved in a vertical direction.

4. The display stand of claim 3 wherein the display means comprises a cathode ray tube.

5. A tilt and height adjustable display stand comprising:
   (a) a base;
   (b) display means;
   (c) linkage means, connecting the base means to the display means, the linkage means including a tilt housing positioned to support the display means, a support housing to which the tilt housing is pivotally attached, at least one support arm rotatably connected at one end to the support housing and rotatably connected at the other end to the base means, and at least one stablizer arm rotatably connected at one end to the support housing and rotatably connected at the other end to the base means to restrict rotation of the support housing; and
   (d) a tilt gas spring connected to offset the weight of the display means when the display is tilted, connected at one end to the tilt housing and at the other end to the support housing to counterbalance the weight of the display means to enable low force tilting of the display means, and a height gas spring, connected at one end to the base means and at the other end to the support housing to offset the weight of the display means when it is moved in a vertical direction.

6. The display stand of claim 5 wherein the display means comprises a cathode ray tube.

7. A tilt adjustable display stand comprising:
   (a) base means;

(b) display means;
(c) linkage means, connecting the base means to the display means; and
(d) gas spring means connected to the linkage means, positioned to counterbalance the weight of the display means to enable low force tilting of the display means, including a tilt gas spring connected to offset the weight of the display means when the display means is tilted.

8. The display stand of claim 7 wherein the gas spring means further comprises a tilt gas spring connected to offset the weight of the display means when the display is tilted and a height gas spring connected to offset the weight of the display means when it is moved in a vertical direction.

9. A tilt and height adjustable display stand comprising:
(a) a base;
(b) display means;
(c) linkage means, connecting the base means to the display means; and
(d) spring means, comprising gas spring means, connected to the linkage means, to counterbalance the weight of the display means to enable low force tilting and height adjustment of the display means.

* * * * *